United States Patent
Yamashita (10) Patent No.: US 11,070,753 B2
(45) Date of Patent: Jul. 20, 2021

(54) IMAGING DEVICE AND METHOD OF DRIVING IMAGING DEVICE

(71) Applicant: CANON KABUSHIKI KAISHA, Tokyo (JP)

(72) Inventor: Takanori Yamashita, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 16/393,394

(22) Filed: Apr. 24, 2019

(65) Prior Publication Data

US 2019/0349540 A1    Nov. 14, 2019

(30) Foreign Application Priority Data

May 14, 2018   (JP) .............................. JP2018-093163

(51) Int. Cl.
| | |
|---|---|
| *H04N 5/359* | (2011.01) |
| *H04N 5/378* | (2011.01) |
| *G06T 7/55* | (2017.01) |
| *B60Q 9/00* | (2006.01) |
| *B60W 30/09* | (2012.01) |

(52) U.S. Cl.
CPC ............ *H04N 5/3595* (2013.01); *G06T 7/55* (2017.01); *H04N 5/378* (2013.01); *B60Q 9/008* (2013.01); *B60W 30/09* (2013.01); *B60W 2420/42* (2013.01); *B60W 2710/0677* (2013.01); *B60W 2710/18* (2013.01); *G06T 2207/30252* (2013.01)

(58) Field of Classification Search
CPC .................................................. H04N 5/3595

USPC .......................................................... 348/113
See application file for complete search history.

(56) References Cited

U.S. PATENT DOCUMENTS

| | | | |
|---|---|---|---|
| 7,903,056 B2 | 3/2011 | Kawasaki | |
| 8,023,027 B2 | 9/2011 | Yamamoto | |
| 9,502,451 B2 | 11/2016 | Yamashita | |
| 9,653,498 B2 | 5/2017 | Yamashita | |
| 9,749,570 B2 | 8/2017 | Yamashita | |
| 10,051,223 B2 | 8/2018 | Yamashita | |

(Continued)

FOREIGN PATENT DOCUMENTS

JP    2008-211540    9/2008

OTHER PUBLICATIONS

U.S. Appl. No. 16/433,088, filed Jun. 6, 2019 by Masahito Shinohara.

*Primary Examiner* — Yulin Sun
(74) *Attorney, Agent, or Firm* — Venable LLP (57) ABSTRACT

An imaging device includes pixels arranged to form columns and each including a photoelectric conversion unit that generates charges by photoelectric conversion, column circuits provided to the columns, respectively, and each receiving a signal from a part of the pixels, a first common control line connected to each of the column circuits, and a control unit that controls the column circuits. Each of the column circuits includes an amplifier circuit whose gain is switchable and a first transistor that controls a current flowing in the amplifier circuit, and the control unit controls the column circuit so that the first transistor supplies a current of a first current value when the amplifier circuit is at a first gain and the first transistor supplies a current of a second current value different from the first current value when the amplifier circuit is at a second gain different from the first gain.

13 Claims, 6 Drawing Sheets

(56) References Cited

U.S. PATENT DOCUMENTS

| | | |
|---|---|---|
| 10,057,529 B2 | 8/2018 | Saito |
| 2015/0189210 A1* | 7/2015 | Shimizu ................ H04N 5/378 |
| | | 348/301 |
| 2016/0191786 A1* | 6/2016 | Iwata ................ H04N 5/23212 |
| | | 348/349 |
| 2017/0272678 A1* | 9/2017 | Sakakibara ....... H01L 27/14634 |
| 2018/0007305 A1* | 1/2018 | Yamashita ........ H01L 27/14683 |
| 2018/0309950 A1 | 10/2018 | Yamashita |
| 2020/0106975 A1* | 4/2020 | Oike ................ H04N 5/37457 |

* cited by examiner

IMAGING DEVICE AND METHOD OF DRIVING IMAGING DEVICE

BACKGROUND OF THE INVENTION

Field of the Invention

The present invention relates to an imaging device and a method of driving imaging device.

Description of the Related Art

As one of the problems occurring in an image captured by an imaging device, smear is known. For example, a smear is a phenomenon in which, when there is a portion brighter than the remaining region in a part of an imaging region, a line of illuminance difference that does not exist in the actual scene occurs over substantially the entire region in the vertical direction or the horizontal direction at the boundary of the bright portion. Conventionally, structure or drive methods of imaging devices for reducing occurrence of a smear have been proposed.

A smear may be caused by an influence of the operation of a readout circuit in addition to an influence of charges generated by an incident light. For example, when a cause of a smear is in an input pre-stage of a column amplifier circuit or a column amplifier circuit, as the gain of the column amplifier circuit is increased, a smear component superimposed on a pixel signal also increases, and this may result in deterioration of an image.

SUMMARY OF THE INVENTION

The present invention intends to provide an imaging device and a method of driving the imaging device that can reduce smear and acquire a better quality image.

According to one aspect of the present invention, provided is an imaging device including a plurality of pixels which are arranged to form a plurality of columns and each of which includes a photoelectric conversion unit that generates charges by photoelectric conversion, a plurality of column circuits which are provided to the plurality of columns, respectively, and each of which receives a signal from a part of the plurality of pixels, a first common control line connected to each of the plurality of column circuits, and a control unit that controls the plurality of column circuits, wherein each of the plurality of column circuits includes an amplifier circuit whose gain is switchable and a first transistor that controls a current flowing in the amplifier circuit, and wherein the control unit controls the column circuit so that the first transistor supplies a current of a first current value when the amplifier circuit is at a first gain and the first transistor supplies a current of a second current value different from the first current value when the amplifier circuit is at a second gain different from the first gain.

Further, according to one aspect of the present invention, provided is a method of driving an imaging device including a plurality of pixels which are arranged to form a plurality of columns and each of which includes a photoelectric conversion unit that generates charges by photoelectric conversion, a plurality of column circuits which are provided to the plurality of columns, respectively, and each of which receives a signal from a part of the plurality of pixels, and a first common control line connected to each of the plurality of column circuits, wherein each of the plurality of column circuits includes an amplifier circuit whose gain is switchable and a first transistor that controls a current flowing in the amplifier circuit, the method including switching the bias voltage to be supplied to the first transistor of each of the plurality of column circuits via the first common control line in accordance with a gain of the amplifier circuit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

An imaging device and a method of driving the same according to a first embodiment of the present invention will be described with reference to FIG. 1 to FIG. 5C.

Figure 1:
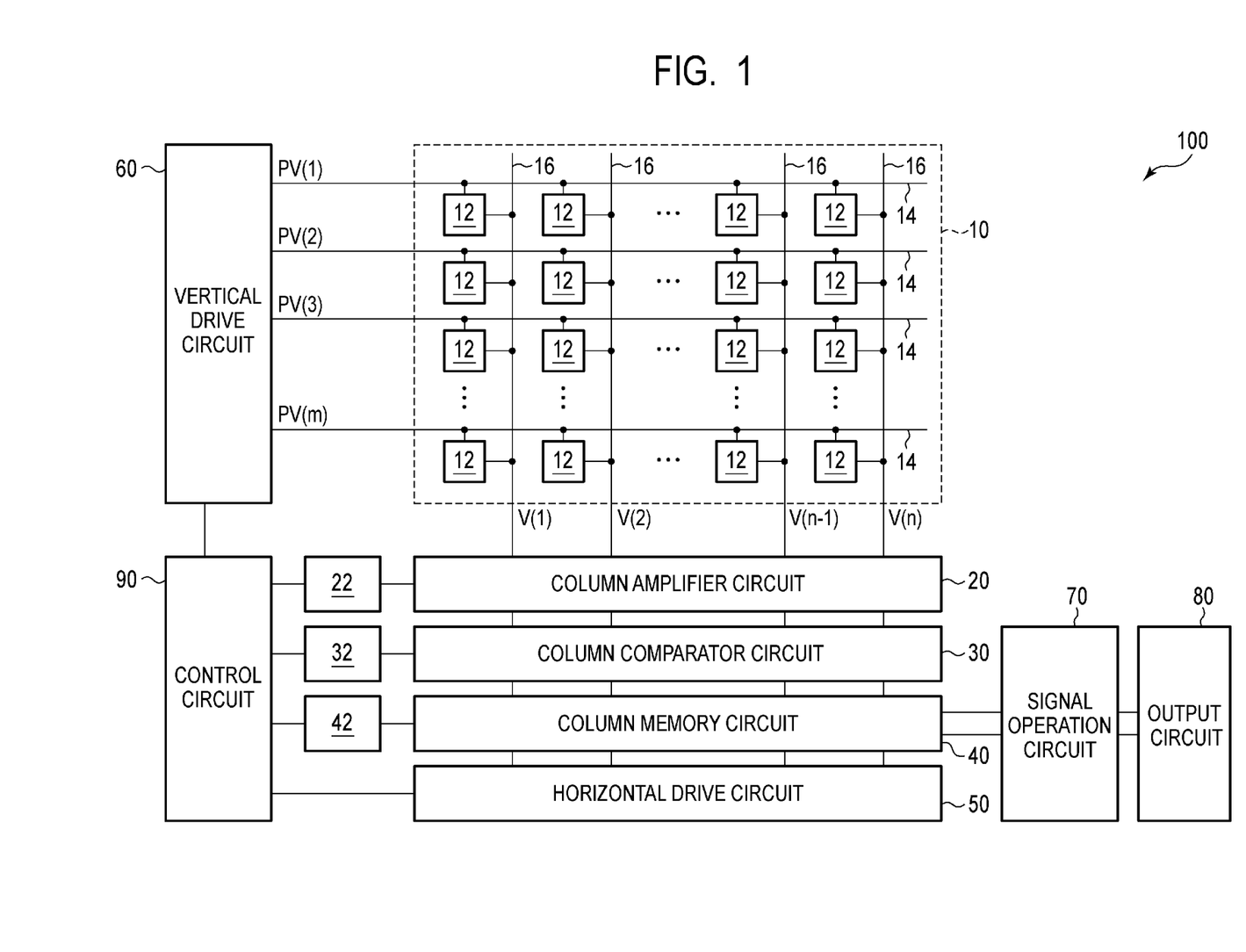
FIG. 1 is a block diagram illustrating a general configuration of an imaging device according to a first embodiment of the present invention.
Figure 2:
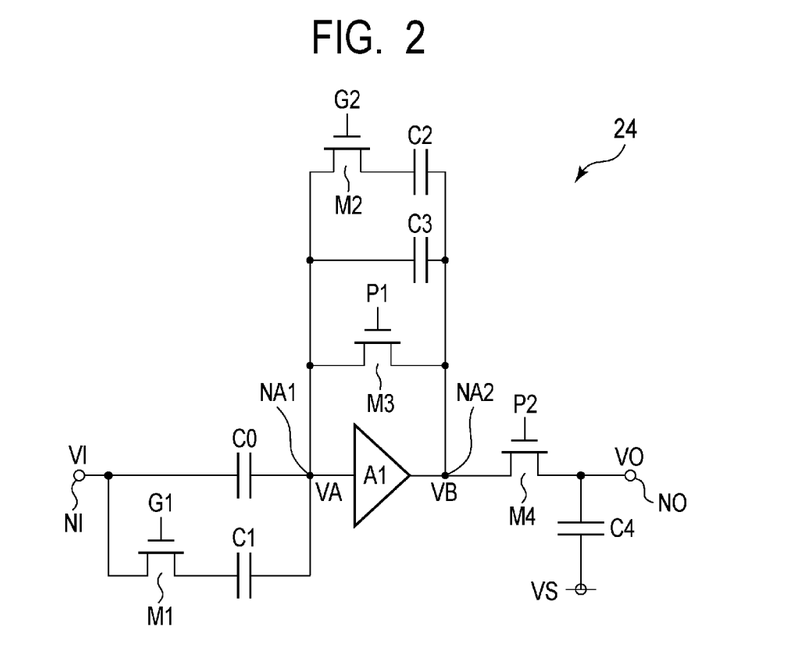
FIG. 2 is a circuit diagram illustrating a configuration example of a column amplifier circuit in the imaging device according to the first embodiment of the present invention.
Figure 3:
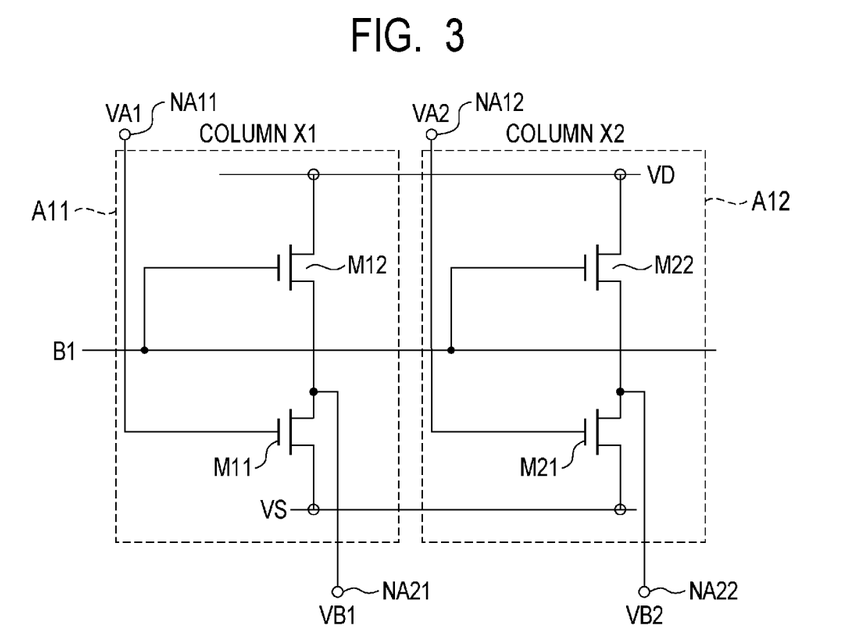
FIG. 3 is a circuit diagram illustrating a configuration example of an amplifier circuit in the imaging device according to the first embodiment of the present invention.
Figure 4:
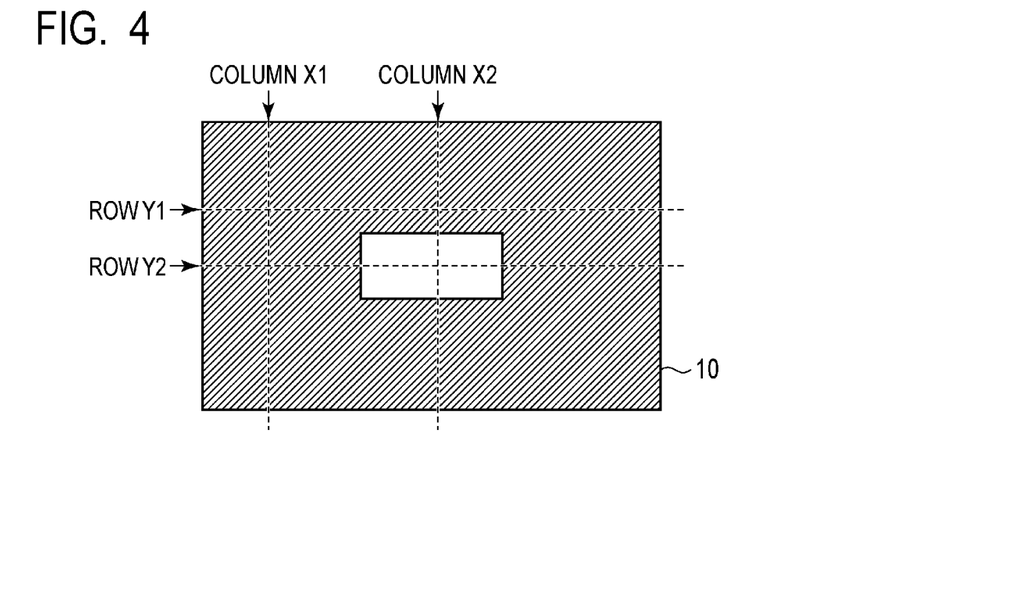
FIG. 4 is a diagram illustrating an example of an image pattern captured by the imaging device.
Figure 5A:
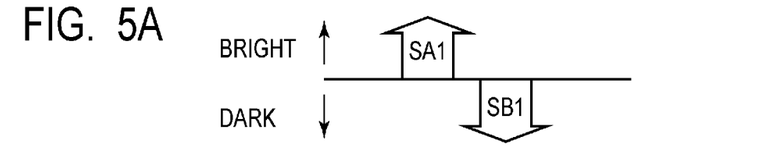
FIG. 5A, FIG. 5B and FIG. 5C are diagrams schematically illustrating an effect of a smear component to a signal level of an imaging signal.
Figure 5B:
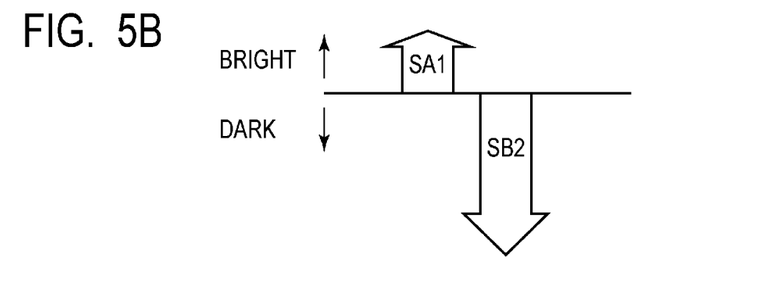
Figure 5C:
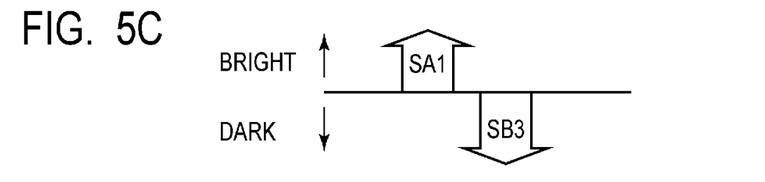

FIG. 1 is a block diagram illustrating a general configuration of the imaging device according to the present embodiment. FIG. 2 is a circuit diagram illustrating a configuration example of a column amplifier circuit in the imaging device according to the present embodiment. FIG. 3 is a circuit diagram illustrating a configuration example of an amplifier circuit in the imaging device according to the present embodiment. FIG. 4 is a diagram illustrating an example of an image pattern captured by the imaging device. FIG. 5A to FIG. 5C are diagrams schematically illustrating an effect of a smear component to a signal level of an imaging signal.

As illustrated in FIG. 1, an imaging device 100 according to the present embodiment includes a pixel region 10, a column amplifier circuit 20, a column comparator circuit 30, a column memory circuit 40, a horizontal drive circuit 50, a vertical drive circuit 60, a signal operation circuit 70, and an output circuit 80. The imaging device 100 further includes a control circuit 90, a column amplifier drive circuit 22, a column comparator drive circuit 32, and a column memory drive circuit 42.

In the pixel region 10, a plurality of pixels 12 arranged in a matrix over a plurality of rows and a plurality of columns are arranged. Each of the pixels 12 includes a photoelectric conversion unit formed of a photoelectric conversion element such as a photodiode and outputs an image signal in accordance with an amount of incident light. While FIG. 1 illustrates the plurality of pixels 12 arranged in a matrix of m rows and n columns as the pixels 12 forming the pixel region 10, the number of pixels 12 forming the pixel region 10 is not particularly limited.

On each row of the pixel region 10, control lines 14 are arranged extending in a first direction (the horizontal direction in FIG. 1). Each of the control lines 14 is connected to the pixels 12 aligned in the first direction, respectively, to form a signal line common to these pixels 12. The first direction in which the control line 14 extends may be referred to as a row direction. The control line 14 on each row is connected to the vertical drive circuit 60.

The vertical drive circuit 60 is a circuit unit that supplies, to the pixels 12 via the control lines 14, control signals PV(1), . . . , PV(m) used for driving readout circuits within the pixels 12 when reading out pixel signals from the pixels 12. Each of the pixels 12 outputs analog image signals V(1), . . . , V(n) in accordance with an amount of charges generated by a photoelectric conversion unit to an output line 16 on the corresponding column in response to the control signals PV(1), . . . , PV(m) supplied from the control line 14 on the corresponding row. An analog image signal output from each of the pixels 12 includes a noise signal (N-signal) and an image signal (S-signal) including noise.

On each column of the pixel region 10, the output lines 16 are arranged extending in a second direction (the vertical direction in FIG. 1) crossing the first direction. Each of the output lines 16 is connected to the pixels 12 aligned in the second direction, respectively, to form a signal line common to these pixels 12. The second direction in which the output line 16 extends may be referred to as a column direction. The output line 16 on each column is connected to the column amplifier circuit 20.

The column amplifier circuit 20 includes a plurality of column circuits corresponding to respective columns of the pixel region 10, amplifies respective analog image signals output to the output lines 16 on respective columns at a predetermined gain, and outputs the amplified analog image signals.

The column amplifier circuit 20 is connected to the column comparator circuit 30. The column comparator circuit 30 includes a plurality of comparator circuits corresponding to respective columns of the pixel region 10 and compares amplified analog image signals on respective columns output from the column amplifier circuit 20 with a predetermined reference voltage such as a ramp signal. Thereby, the column comparator circuit 30 converts the amplified analog image signal on respective columns output from the column amplifier circuit 20 into digital image signals (digital N-signals and digital S-signals). The column comparator circuit 30 is connected to the column memory circuit 40.

The column memory circuit 40 includes a plurality of memories corresponding to respective columns of the pixel region 10 and holds digital image signals (digital N-signals and digital S-signals) on respective columns output from the column comparator circuit 30, respectively. The horizontal drive circuit 50 and the signal operation circuit 70 are connected to the column memory circuit 40.

The horizontal drive circuit 50 is a circuit unit that supplies, to the column memory circuit 40, a control signal used for sequentially outputting digital image signals stored in the memories on respective columns of the column memory circuit 40 to the signal operation circuit 70. The signal operation circuit 70 is a circuit unit that performs a predetermined operation process on digital image signals received from the column memory circuit 40. The output circuit 80 is connected to the signal operation circuit 70. The output circuit 80 is a circuit unit that includes an external interface such as Low Voltage Differential Signaling (LVDS) and outputs digital image signals processed in the signal operation circuit 70 to the outside of the imaging device 100.

The control circuit 90 is a control unit for supplying, to the column amplifier drive circuit 22, the column comparator drive circuit 32, the column memory drive circuit 42, the horizontal drive circuit 50, and the vertical drive circuit 60, control signals that control the operations of these circuits and the timing thereof. The column amplifier drive circuit 22 is a control unit that controls the column amplifier circuit 20 in accordance with a control signal supplied from the control circuit 90. The column comparator drive circuit 32 is a control unit that controls the column comparator circuit 30 in accordance with a control signal supplied from the control circuit 90. The column memory drive circuit 42 is a control unit that controls the column memory circuit 40 in accordance with a control signal supplied from the control circuit 90. At least some of these control signals may be supplied from the outside of the imaging device 100.

Note that, while the configuration example having the readout circuit configured to convert an image signal from an analog signal into a digital signal and output the converted digital signal is illustrated in FIG. 1, the configuration of the readout circuit is not particularly limited thereto. For example, such a configuration that outputs an analog image signal output from the pixel region 10 to the outside of the imaging device 100 without conversion to a digital image signal may be employed.

Next, a configuration example of a column circuit that is included in the column amplifier circuit 20 and corresponds to each column of the pixel region 10 will be described by using FIG. 2.

As illustrated in FIG. 2, a column circuit 24 of the column amplifier circuit 20 provided on each corresponding column of the pixel region 10 includes an amplifier circuit A1, capacitors C0, C1, C2, C3, and C4, and transistors M1, M2, M3, and M4. The column circuit 24 has a node N1, which is the input terminal, and a node N0, which is the output terminal. The node N1 is supplied with an input voltage V1 from the pixel 12 via the output line 16 on the corresponding column. The input voltage V1 is any one of the analog image signals V(1), . . . , V(n) described above.

The node N1 is connected to one of the terminals of the source and the drain of the transistor M1 and one terminal of the capacitor C0. The other terminals of the source and the drain of the transistor M1 is connected to one terminal of the capacitor C1. The other terminal of the capacitor C0 and the other terminal of the capacitor C1 are connected to an input terminal NA1 of the amplifier circuit A1.

The input terminal NA1 of the amplifier circuit A1 is further connected to one of the terminals of the source and the drain of the transistor M2, one of the terminals of the source and the drain of the transistor M3, and one terminal of the capacitor C3. The other terminals of the source and the drain of the transistor M2 are connected to one terminal of the capacitor C2. The other terminals of the source and the drain of the transistor M3, the other terminal of the capacitor C2, and the other terminal of the capacitor C3 are connected to an output terminal NA2 of the amplifier circuit A1.

The output terminal NA2 of the amplifier circuit A1 is further connected to one of the terminals of the source and the drain of the transistor M4. The other terminals of the source and the drain of the transistor M4 are connected to one terminal of the capacitor C4. The other terminal of the capacitor C4 is connected to a power supply node of a voltage VS. The connection node of the other terminals of the source and the drain of the transistor M4 and one terminal of the capacitor C4 is a node N0. An output voltage V0 from the node N0 is supplied to the column comparator circuit 30.

The gates of the transistor M1, M2, M3, and M4 are connected to the control circuit 90 via the column amplifier drive circuit 22. The transistor M1 forms a switch controlled by a select signal G1 supplied from the column amplifier drive circuit 22. The transistor M2 forms a switch controlled by a select signal G2 supplied from the column amplifier drive circuit 22. The transistor M3 forms a switch controlled by a control signal P1 supplied from the column amplifier drive circuit 22. The transistor M4 forms a switch controlled by a control signal P2 supplied via the column amplifier drive circuit 22.

The operations of the transistors M1 and M2 are controlled by the select signals G1 and G2 from the control circuit 90 in accordance with a gain setting of the column amplifier circuit 20. For example, when the select signal G1 is at a low level, the transistor M1 is turned off (the capacitor C1 is disabled), and the input capacitance of the amplifier circuit A1 is C0. On the other hand, when the select signal G1 is at a high level, the transistor M1 is turned on (the capacitor C1 is enabled), and the input capacitance of the amplifier circuit A1 is C0+C1. Further, when the select signal G2 is at a low level, the transistor M2 is turned off (the capacitor C2 is disabled), and the feedback capacitance of the amplifier circuit A1 is C3. On the other hand, when the select signal G2 is at a high level, the transistor M2 is turned on (the capacitor C2 is enabled), and the feedback capacitance of the amplifier circuit A1 is C2+C3. In such a way, the input capacitance and the feedback capacitance of the amplifier circuit A1 can be selected from a plurality of capacitance values.

The gain setting of the amplifier circuit A1 is determined by a ratio of the input capacitance and the feedback capacitance set by the select signals G1 and G2 in such a way.

The transistor M3 is a switch used for resetting the amplifier circuit A1, and the operation of the transistor M3 is controlled by a control signal P1 from the control circuit 90. For example, when the control signal P1 is at a high level, the transistor M3 is turned on, the amplifier circuit A1 is in a voltage follower state where the input terminal and the output terminal are short-circuited, and the amplifier circuit A1 is reset.

The transistor M4 is a switch used for performing a sample and hold operation for holding an analog image signal amplified by the amplifier circuit A1 (the N-signal and the S-signal) in the capacitor C4, and the operation of the transistor M4 is controlled by a control signal P2 from the control circuit 90. For example, when the control signal P2 is at a high level, the transistor M4 is turned on, and the output voltage V0 of the amplifier circuit A1 is held in the capacitor C4.

Note that the circuit configuration for setting an input capacitance and a feedback capacitance of the amplifier circuit A1 is not limited to that illustrated in FIG. 2. For example, the input capacitor or the feedback capacitor may be configured to be selectable from three or more capacitance values. Further, a transistor may be connected in series to each of the capacitors C0 and C3 in the same manner as the capacitors C1 and C2.

Next, a configuration example of the amplifier circuit A1 will be described by using FIG. 3. FIG. 3 illustrates two amplifier circuits A1 (amplifier circuits A11 and A12) forming the column circuit 24 on two column (X1-th column and X2-th column). An input terminal NA11 and an output terminal NA21 of the amplifier circuit A11 correspond to the input terminal NA1 and the output terminal NA2 of the amplifier circuit A1 of FIG. 2. The input voltage of the amplifier circuit A11 is VA1, and the output voltage of the amplifier circuit A11 is VB1. Similarly, an input terminal NA12 and an output terminal NA22 of the amplifier circuit A12 correspond to the input terminal NA1 and the output terminal NA2 of the amplifier circuit A1 of FIG. 2. The input voltage of the amplifier circuit A12 is VA2, and the output voltage of the amplifier circuit A12 is VB2.

The amplifier circuit A11 on the X1-th column is a common source amplifier circuit including transistors M11 and M12. The input terminal NA11 of the amplifier circuit A11 is connected to the gate of the transistor M11. The source of the transistor M11 is connected to the power supply node of the voltage VS. The drain of the transistor M11 is connected to the drain of the transistor M12. The source of the transistor M12 is connected to the power supply node of the voltage VD. The connection node of the drain of the transistor M11 and the drain of the transistor M12 is the output terminal NA21 of the amplifier circuit A11. The transistor M11 is a common source transistor, and the transistor M12 is a current source transistor in which a drive current is set by a bias voltage applied to the gate thereof.

Similarly, the amplifier circuit A12 on the X2-th column is a common source amplifier circuit including transistors M21 and M22. The input terminal NA12 of the amplifier circuit A12 is connected to the gate of the transistor M21. The source of the transistor M21 is connected to the power supply node of the voltage VS. The drain of the transistor M21 is connected to the drain of the transistor M22. The source of the transistor M22 is connected to the power supply node of the voltage VD. The connection node of the drain of the transistor M21 and the drain of the transistor M22 is the output terminal NA22 of the amplifier circuit A12. The transistor M21 is a common source transistor, and the transistor M22 is a current source transistor in which a drive current is set by the bias voltage applied to the gate thereof. Note that, in the present specification, the current source transistors such as the transistors M12 and M22 are different components from the amplifier circuits A11 and A12 and may be handled as transistors that supply currents of predetermined current values to the amplifier circuits A11 and A12.

The gate of the transistor M12 of the amplifier circuit A11 and the gate of the transistor M22 of the amplifier circuit A12 are connected to the common control line B1 common to the amplifier circuit A1 on each column. The bias voltage in accordance with drive current setting of the transistors M12 and M22 is supplied from the column amplifier drive circuit 22 to the gates of the transistor M12 and M22 via the common control line B1.

Next, the operation of the amplifier circuit A1 when an image pattern illustrated in FIG. 4 is captured by the circuit configuration described above will be described. Here, the image pattern expected in FIG. 4 includes a region in a dark state without light input and a region where light input is strong and a photoelectric conversion element of a pixel circuit is in a saturated state. For example, the pixels 12 at the Y1-th row, the X1-th column, at the Y1-th row, the X2-th column, and at the Y2-th row, the X1-th column are in a dark state without light input, and the pixel 12 at the Y2-th row, the X2-th column is a pixel where light input is strong and a photoelectric conversion element of a pixel circuit is in a saturated state.

First, a readout operation on the Y1-th row is performed. On the Y1-th row, the pixel 12 on the X1-th column and the pixel 12 on the X2-th column are both in a dark state. Therefore, voltages in accordance with a dark state are output from the output terminal NA21 of the amplifier circuit A11 on the X1-th column and the output terminal NA22 of the amplifier circuit A12 on the X2-th column, respectively. That is, the output voltage VB1 on the X1-th column and the output voltage VB2 on the X2-th column are the same.

Next, subsequent to the readout operation on the Y1-th row, a readout operation on the Y2-th row is performed. On the Y2-th row, while the pixel 12 on the X1-th column is maintained in a dark state, the pixel 12 on the X2-th column transitions from a dark state to a saturated state. Therefore, the output voltage VB2 of the amplifier circuit A12 on the X2-th column is higher than the output voltage VB1 of the amplifier circuit A11 on the X1-th column.

Next, an influence due to a change of the output voltage VB2 of the amplifier circuit A12 on the X2-th column from a potential corresponding to a dark state to a potential corresponding to a saturated state will be described by using FIG. 3. Here, illustration is provided assuming that the X1-th column and the X2-th column in FIG. 4 correspond to the X1-th column and the X2-th column in FIG. 3, respectively.

In response to transition of the pixel 12 from a dark state to a saturated state and a potential change of the output voltage VB2 in the increasing direction, the change in the potential affects the potential of the common control line B1 as with the operation on the X2-th column when the readout operation transitions from the Y1-th row to the Y2-th row. That is, since there is a parasitic capacitance between the gate and the drain of the transistor M22, a potential change of the output voltage VB2 in the increasing direction causes the potential of the common control line B1 to also change in the increasing direction due to capacitance coupling between the gate and the drain of the transistor M22.

Since the bias voltage of the common control line B1 is supplied from the column amplifier drive circuit 22, the column amplifier drive circuit 22 operates so as to recover the changed potential back to the original bias voltage. Since a long time is required for the bias voltage to recover the original potential, however, the potential of the common control line B1 may change with a certain time constant as a result.

Such a potential change of the common control line B1 causes occurrence of a smear in the following two forms.

The first form is a mode in which, in response to a change of the potential of the common control line B1 in the increasing direction, the output voltage VB1 of the amplifier circuit A11 on the X1-th column changes in the increasing direction via the parasitic capacitance between the gate and the drain of the transistor M12.

When the amplifier circuit A11 on the X1-th column is focused on, although the pixels 12 are in the same dark state on the Y1-th row and the Y2-th row, the output voltage VB1 of the amplifier circuit A11 on the Y2-th row is larger than the output voltage VB1 of the amplifier circuit A11 on the Y1-th row. That is, when the pixels 12 with light incidence are included in the same row, the output voltage of the amplifier circuits A1 on the column of the pixels 12 in a dark state is larger than the output voltage of the amplifier circuits A1 when all the pixels 12 on the same row are in a dark state. Therefore, when the pixel 12 with light incidence is included in the same row, the output signal from the pixel 12 in a dark state will include a smear component by which an image is viewed brighter than a dark state when all the pixels 12 on the same row are in a dark state. A smear generated by the first form directly works on the output of the amplifier circuit A1 and thus has a feature that does not depends on the gain of the amplifier circuit A1.

The second form is a mode in which, in response to a change of the potential of the common control line B1 in the increasing direction, the voltage between the gate and the source of the transistor M12 decreases and the drive current of the transistor M12 decreases.

When the amplifier circuit A11 on the X1-th column is focused on, although the pixels 12 are in a dark state on the Y1-th row and the Y2-th row, the output voltage VB1 of the amplifier circuit A11 on the Y2-th row is smaller than the output voltage VB1 of the amplifier circuit A11 on the Y1-th row. That is, when the pixels 12 with light incidence are included in the same row, the output voltage of the amplifier circuits A1 on the column of the pixels 12 in a dark state is smaller than the output voltage of the amplifier circuits A1 when all the pixels 12 on the same row are in a dark state. Therefore, when the pixel 12 with light incidence is included in the same row, the output signal from the pixel 12 in a dark state will include a smear component by which an image is viewed darker than a dark state when all the pixels 12 on the same row are in a dark state. A smear generated by the second form works on the input stage of the amplifier circuit A1 and thus has a feature that depends on the gain of the amplifier circuit A1.

Therefore, when a gain is set in the column amplifier circuit 20 in a state where the above two forms of smear may occur, while a smear component of the first form is not amplified at the gain, a smear component of the second form is amplified at the gain. Therefore, in addition that these two smear components affect each other, an influence of a gain set to the column amplifier circuit 20 may be superimposed on a smear recognized as an image.

In such a way, a cause of a smear includes a smear component of the first form that does not depends on the gain of the column amplifier circuit 20 (smear component A) and a smear component of the second form that depends on the gain of the column amplifier circuit 20 (smear component B).

FIG. 5A to FIG. 5C are diagrams schematically representing how the smear component A and the smear component B work on the signal level of an image signal.

FIG. 5A illustrates a state where the gain setting value of the column amplifier circuit 20 is small, the smear component SA1 and the smear component SB1 cancel each other and thus the sum of smear amounts (SA1+SB1) is zero, and no smear occurs. A state where the gain setting value of the column amplifier circuit 20 is increased will be described based on the above state as a reference.

FIG. 5B illustrates a state where a larger value than the gain setting value in FIG. 5A is set as a gain setting value of the column amplifier circuit 20. In such a case, while the smear component SA1 that does not depend on the gain of the column amplifier circuit 20 remains, the smear component SB1 that depends on the gain of the column amplifier circuit 20 is amplified at the gain setting value of the column amplifier circuit 20 to be a smear component SB2. As a result, the sum of smear amounts (SA1+SB2) becomes minus, and a smear resulting in a darker image occurs.

In view of the above, in the present embodiment, the voltage to be supplied to the common control line B1 is set to a large value so that a larger gain setting value of the column amplifier circuit 20 results in smaller current values of the transistors M12 and M22. With such a configuration, when the potential of the common control line B1 changes, it is possible to reduce the amount of a current change with respect to a potential change of the common control line B1 occurring due to the second form compared to a case where the current values of the transistors M12 and M22 are large. That is, it is possible to reduce the amount of a change of the output voltage VB in the output terminal NA2 of the amplifier circuit A1.

FIG. 5C illustrates a state where the same value as the gain setting value in FIG. 5B is set as a gain setting value of the column amplifier circuit 20 and driving according to the present embodiment is performed. Also in this case, while the smear component SA1 that does not depend on the gain of the column amplifier circuit 20 remains, the smear component SB1 that depends on the gain of the column amplifier circuit 20 is amplified at the gain setting value of the column amplifier circuit 20 to be a smear component SB3. However, by performing driving according to the present embodiment, it is possible to reduce the amount of a current change of the transistors M12 and M22 with respect to the potential change of the common control line B1 and to reduce the smear component SB3 to be smaller than the smear component SB2. Therefore, although the sum of smear amounts (SA1+SB3) becomes minus and a smear resulting in a darker image occurs, the level of the smear can be reduced compared to the state illustrated in FIG. 5B.

Therefore, according to the drive method of the present embodiment, even when the gain setting value of the column amplifier circuit 20 is large, a high quality image can be acquired without increase of a smear that causes a darker image.

The drive method of the present embodiment will now be specifically described assuming that the imaging device has two gain setting modes of a gain setting 1 and a gain setting 2. The gain setting 1 is to set the select signals G1 and G2 in FIG. 2 to a selected state (the transistors M1 and M2 are turned on) and set the gain value of the amplifier circuit A1 to (C0+C1)/(C2+C3). The gain setting 2 is to set the select signal G1 in FIG. 2 to a selected state (the transistor M1 is turned on) and set the select signal G2 to a non-selected state (the transistor M2 is turned off) to set the gain value of the amplifier circuit A1 to (C0+C1)/C3. In such a case, the gain value of the gain setting 2 is larger than the gain value of the gain setting 1.

As illustrated in FIG. 3, the gate voltage of the transistors M12 and M22 is supplied from the column amplifier drive circuit 22 via the common control line B1. Here, when the bias voltage supplied to the gates of the transistors M12 and M22 via the common control line B1 is $V\alpha$, the voltage between each gate and each source of the transistors M12 and M22 is $VD-V\alpha$. In the present embodiment, the bias voltage supplied from the common control line B1 is set so that the voltage between each gate and each source of the transistors M12 and M22 in the gain setting 2 is lower than the voltage between each gate and each source of the transistors M12 and M22 in the gain setting 1.

When the bias voltage supplied to the gates of the transistors M12 and M22 via the common control line B1 in the gain setting 1 is $V\alpha1$, the voltage between each gate and each source of the transistors M12 and M22 is $VD-V\alpha1$. Similarly, when the bias voltage supplied to the gates of the transistors M12 and M22 via the common control line B1 in the gain setting 2 is $V\alpha2$, the voltage between each gate and each source of the transistors M12 and M22 is $VD-V\alpha2$. Accordingly, in the present embodiment, the bias voltage $V\alpha2$ is set to a larger value than the bias voltage $V\alpha1$ so that the voltage between each gate and each source of the transistors M12 and M22 satisfies a relationship of $(VD-V\alpha2)<(VD-V\alpha1)$. The bias voltage supplied to the gates of the transistors M12 and M22 via the common control line B1 can be switched by a setting value input from the control circuit 90 to the column amplifier drive circuit 22.

By changing the bias voltage supplied to the gates of the transistors M12 and M22 in such a way, it is possible to reduce the amount of a current change of the transistors M12 and M22 that may cause a smear of the second form even if a potential change of the common control line B1 occurs. Thereby, it is possible to reduce the amount of change of the output voltage VB at the output terminal NA2 of the amplifier circuit A1 and reduce the smear component SB2 as illustrated as the smear component SB3 in FIG. 5C. Therefore, even when the gain setting value of the column amplifier circuit 20 is large, a high quality image can be acquired without increase of a smear that causes a darker image.

As described above, according to the present embodiment, smear can be reduced, and a higher quality image can be acquired.

Second Embodiment

Figure 6:
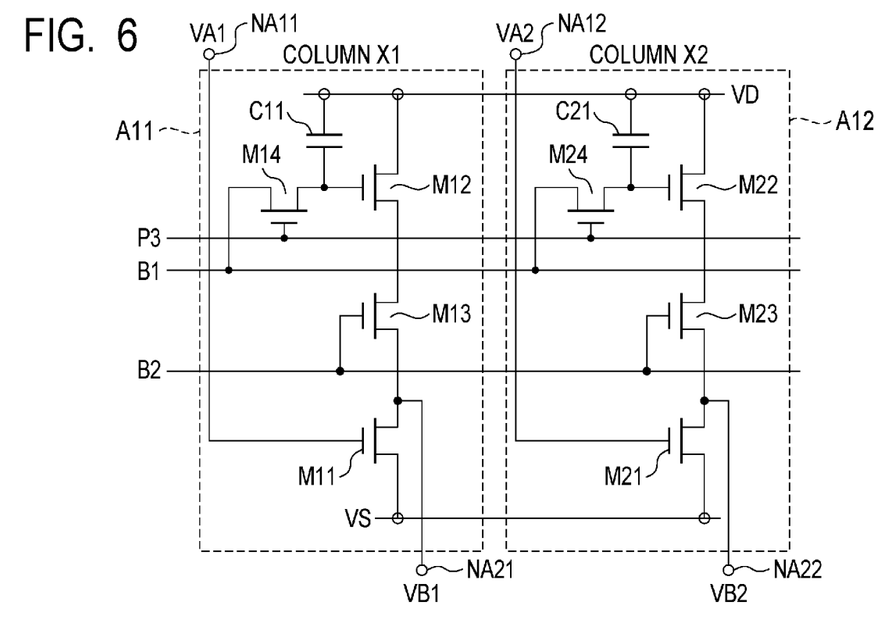
FIG. 6 is a circuit diagram illustrating a configuration example of an amplifier circuit in an imaging device according to a second embodiment of the present invention.

An imaging device and a method of driving the same according to a second embodiment of the present invention will be described with reference to FIG. 6. The same components as those of the imaging device according to the first embodiment are labeled with the same reference, and the description thereof will be omitted or simplified. FIG. 6 is a circuit diagram illustrating a configuration example of an amplifier circuit in the imaging device of the present embodiment.

The imaging device according to the present embodiment is the same as the imaging device according to the first embodiment except a difference in the configuration of the amplifier circuit A1. In the present embodiment, the configuration and the operation of the amplifier circuit A1 will be described mainly for features different from that of the first embodiment. FIG. 6 illustrates a configuration example of two amplifier circuits A1 (amplifier circuits A11 and A12) forming the column circuit 24 on two columns (X1-th column and X2-th column).

As illustrated in FIG. 6, the amplifier circuit A11 of the imaging device of the present embodiment includes transistors M11, M12, M13, and M14 and a capacitor C11. A difference from the amplifier circuit A11 of the first embodiment is that the transistors M13 and M14 and the capacitor C11 are further provided. Similarly, as illustrated in FIG. 6, the amplifier circuit A12 includes transistors M21, M22, M23, and M24 and a capacitor C21. A difference from the amplifier circuit A12 of the first embodiment is that the transistors M23 and M24 and the capacitor C21 are further provided.

The input terminal NA11 of the amplifier circuit A11 on the X1-th column is connected to the gate of the transistor M11. The source of the transistor M11 is connected to the power supply node of the voltage VS. The drain of the transistor M11 is connected to the drain of the transistor M13. The connection node of the drain of the transistor M11 and the drain of the transistor M13 is the output terminal NA21 of the amplifier circuit A11. The source of the transistor M13 is connected to the drain of the transistor M12. The source of the transistor M12 is connected to the power supply node of the voltage VD. The gate of the transistor M12 is connected to one of the terminals of the source and the drain of the transistor M14 and one terminal of the capacitor C11. The other terminal of the capacitor C11 is connected to the power supply node of the voltage VD.

Similarly, the input terminal NA12 of the amplifier circuit A12 on the X2-th column is connected to the gate of the transistor M21. The source of the transistor M21 is connected to the power supply node of the voltage VS. The drain of the transistor M21 is connected to the drain of the transistor M23. The connection node of the drain of the transistor M21 and the drain of the transistor M23 is the output terminal NA22 of the amplifier circuit A12. The source of the transistor M23 is connected to the drain of the transistor M22. The source of the transistor M22 is connected to the power supply node of the voltage VD. The gate of the transistor M22 is connected to one of the terminals of the source and the drain of the transistor M24 and one terminal of the capacitor C21. The other terminal of the capacitor C21 is connected to the power supply node of the voltage VD.

The other terminal of the source and the drain of the transistor M14 of the amplifier circuit A11 and the other terminal of the source and the drain of the transistor M24 of the amplifier circuit A12 are connected to the common control line B1 common to the amplifier circuits A1 on each column. The gate of the transistor M13 of the amplifier circuit A11 and the gate of the transistor M23 of the amplifier circuit A12 are connected to the common control line B2 common to the amplifier circuit A1 on each column. The gate of the transistor M14 of the amplifier circuit A11 and the gate of the transistor M24 of the amplifier circuit A12 are connected to a control line supplied with a control signal P3 common to the amplifier circuit A1 on each column.

Next, the operation of the amplifier circuit A1 in the imaging device according to the present embodiment will be described with an example of the amplifier circuit A11 on the X1-th column.

In the amplifier circuit A1 of the present embodiment, the gate of the transistor M12 that functions as a current source transistor is not directly connected to the common control line B1 but connected via the transistor M14. A bias voltage held in the capacitor C11 via the transistor M14 that performs a sample and hold operation by the control signal P3 supplied from the control line is a gate voltage used for driving the transistor M12. That is, the transistor M14 and the capacitor C11 serve as a sample and hold circuit that holds a bias voltage supplied to the gate of the transistor M12. With such a configuration, the gate voltage of the transistor M12 at driving is the bias voltage held in the capacitor C11. That is, as described in the first embodiment, even when the bias voltage of the common control line B1 changes by being affected by the amplifier circuit A1 on another column, it is possible to prevent such a change from directly affecting the gate voltage of the transistor M12.

Further, in the amplifier circuit A1 of the present embodiment, the transistor M13 is further provided between the transistor M11 and the transistor M12 connected in a cascade configuration. The transistor M13 is driven by a bias voltage generated by the column amplifier drive circuit 22 and supplied via the common control line B2. With such a configuration, also when the output voltage VB1 of the amplifier circuit A11 changes, the transistor M13 is able to suppress change of the drain voltage of the transistor M12 and supply a constant stable current.

Next, an operation state of the amplifier circuit A1 when an image pattern illustrated in FIG. 4 is captured with the circuit configuration described above will be described.

As with the operation on the X2-th column when the readout operation transitions from the Y1-th row to the Y2-th row, when the pixel 12 transitions from a dark state to a saturated state and the potential of the output voltage VB2 changes in the increasing direction, the change in the potential affects the potential of the common control line B2. That is, since there is a parasitic capacitance between the gate and the drain of the transistor M23, a potential change of the output voltage VB2 in the increasing direction causes the potential of the common control line B2 to also change in an increasing direction due to parasitic coupling between the gate and the drain of the transistor M23.

Since the bias voltage of the common control line B2 is supplied from the column amplifier drive circuit 22, the column amplifier drive circuit 22 operates so as to recover the changed potential back to the original bias voltage. Since a long time is required for the bias voltage to recover the original potential, however, the potential of the common control line B2 may change with a certain time constant as a result.

Such a potential change of the common control line B2 causes occurrence of a smear in the following two forms.

The first form is a mode in which, in response to a change of the potential of the common control line B2 in the increasing direction, the output voltage VB1 of the amplifier circuit A11 on the X1-th column changes in the increasing direction via the parasitic capacitance between the gate and the drain of the transistor M13. This operation is the same as the first form described in the first embodiment.

The second form is a mode in which, in response to a change of the potential of the common control line B2 in the increasing direction, the voltage between the gate and the source of the transistor M13 decreases and the drive current of the transistor M13 decreases. This operation is the same as the second form described in the first embodiment.

As described in the first embodiment, when a gain is set in the column amplifier circuit 20, while a smear component of the first form is not amplified at the gain, a smear component of the second form is amplified at the gain. Therefore, in addition that these two smear components affect each other, an influence of a gain set to the column amplifier circuit 20 may be superimposed on a smear that is visible as an image.

Accordingly, also in the present embodiment, the voltage supplied to the common control line B1 is set to a large value so that a larger gain setting value of the column amplifier circuit 20 results in a smaller current value of the transistors M12 and M22 in the same manner as the case of the first embodiment. With such a configuration, when the potential of the common control line B2 changes, it is possible to reduce the amount of a current change with respect to a potential change of the common control line B2 occurring due to the second form compared to a case where the current values of the transistors M12 and M22 are large. That is, it is possible to reduce the amount of a change of the output voltage VB in the output terminal NA2 of the amplifier circuit A1.

Note that, while the present embodiment is configured to sample and hold the gate voltages of the current source transistors (the transistors M12 and M22) on a column basis, it may be configured to sample and hold the gate voltages of the current source transistors on multiple column basis.

Further, also for the transistors M13 and M23, a transistor and a capacitor for performing a sample and hold operation on the bias voltage supplied to the common control line B2 may be provided in a similar manner for the transistors M12 and M22. With such a configuration, even when the bias voltage of the common control line B2 changes by being affected by the amplifier circuit A1 on another column, it is possible to prevent such a change from directly affecting the gate voltage of the transistors M13 and M23.

As described above, according to the present embodiment, smear can be reduced, and a higher quality image can be acquired.

Third Embodiment

Figure 7:
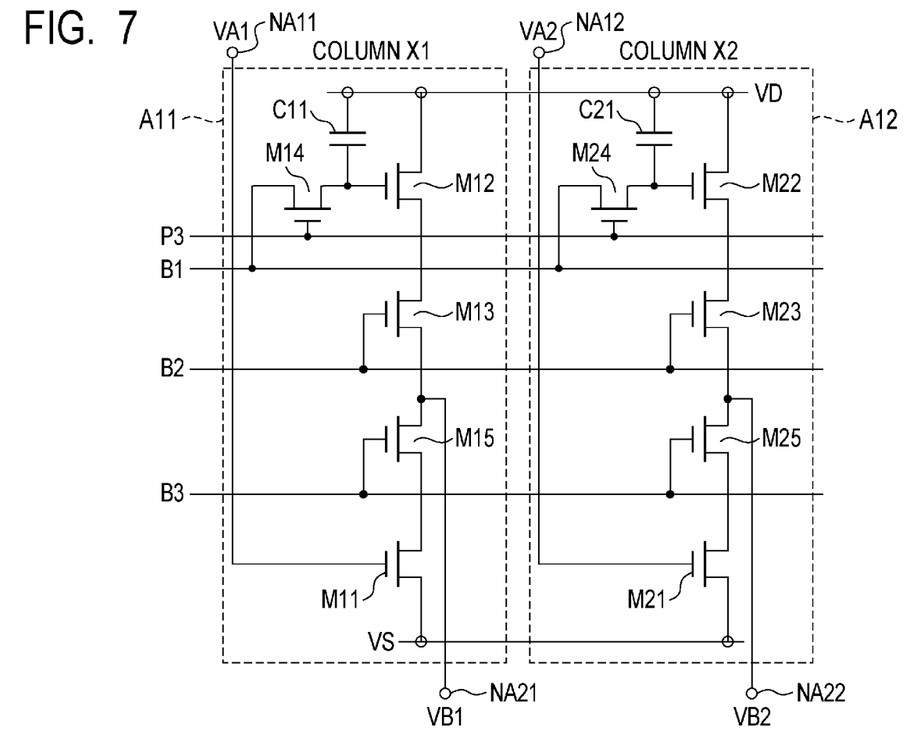
FIG. 7 is a circuit diagram illustrating a configuration example of an amplifier circuit in an imaging device according to a third embodiment of the present invention.

An imaging device and a method of driving the same according to a third embodiment of the present invention will be described with reference to FIG. 7. The same components as those of the imaging device according to the first embodiment are labeled with the same reference, and the description thereof will be omitted or simplified. FIG. 7 is a circuit diagram illustrating a configuration example of an amplifier circuit in the imaging device of the present embodiment.

The imaging device according to the present embodiment is the same as the imaging devices according to the first and second embodiments except that the configuration of the amplifier circuit A1 is different. In the present embodiment, the configuration and the operation of the amplifier circuit A1 will be described mainly for features different from that of the second embodiment. FIG. 7 illustrates a configuration example of two amplifier circuits A1 (amplifier circuits A11 and A12) forming the column circuit 24 on two columns (X1-th column and X2-th column).

As illustrated in FIG. 7, the amplifier circuit A11 of the imaging device of the present embodiment includes transistors M11, M12, M13, M14, and M15 and a capacitor C11. A difference from the amplifier circuit A11 of the second embodiment is that the transistor M15 is further provided. Similarly, as illustrated in FIG. 7, the amplifier circuit A12 includes transistors M21, M22, M23, M24, and M25 and a capacitor C21. A difference from the amplifier circuit A12 of the second embodiment is that the transistor M25 is further provided.

The transistor M15 is connected between the transistor M11 and the transistor M13. Specifically, the drain of the transistor M15 is connected to the drain of the transistor M11, and the source of the transistor M15 is connected to the drain of the transistor M13. Further, the transistor M25 is connected between the transistor M21 and the transistor M23. Specifically, the drain of the transistor M25 is connected to the drain of the transistor M21, and the source of the transistor M25 is connected to the drain of the transistor M23. The gate of the transistor M15 and the gate of the transistor M25 are connected to the common control line B3 common to the amplifier circuits A1 on each column. Transistors M15 and M25 are driven by the bias voltage supplied from the column amplifier drive circuit 22 via the common control line B3. With such cascode connection of the transistors M15 and M25, the output resistance can be increased to increase the gain of the amplifier circuit.

Also in the present embodiment, due to an influence of output from the amplifier circuit A1 on another column via the common control lines B2 and B3, a smear may occur in the forms described in the first and second embodiments. Accordingly, also in the present embodiment, the voltage supplied to the common control line B1 is set to a large value so that a large gain setting value of the column amplifier circuit 20 results in a smaller current value of the transistors M12 and M22 in the same manner as the case of the first and second embodiments. With such a configuration, when the potentials of the common control lines B2 and B3 change, it is possible to reduce the amount of a current change with respect to a potential change of the common control line B2 compared to a case where the current value of the transistors M12 and M22 are large. That is, it is possible to reduce the amount of a change of the output voltage VB in the output terminal NA2 of the amplifier circuit A1.

As described above, according to the present embodiment, smear can be reduced, and a higher quality image can be acquired.

Fourth Embodiment

Figure 8:
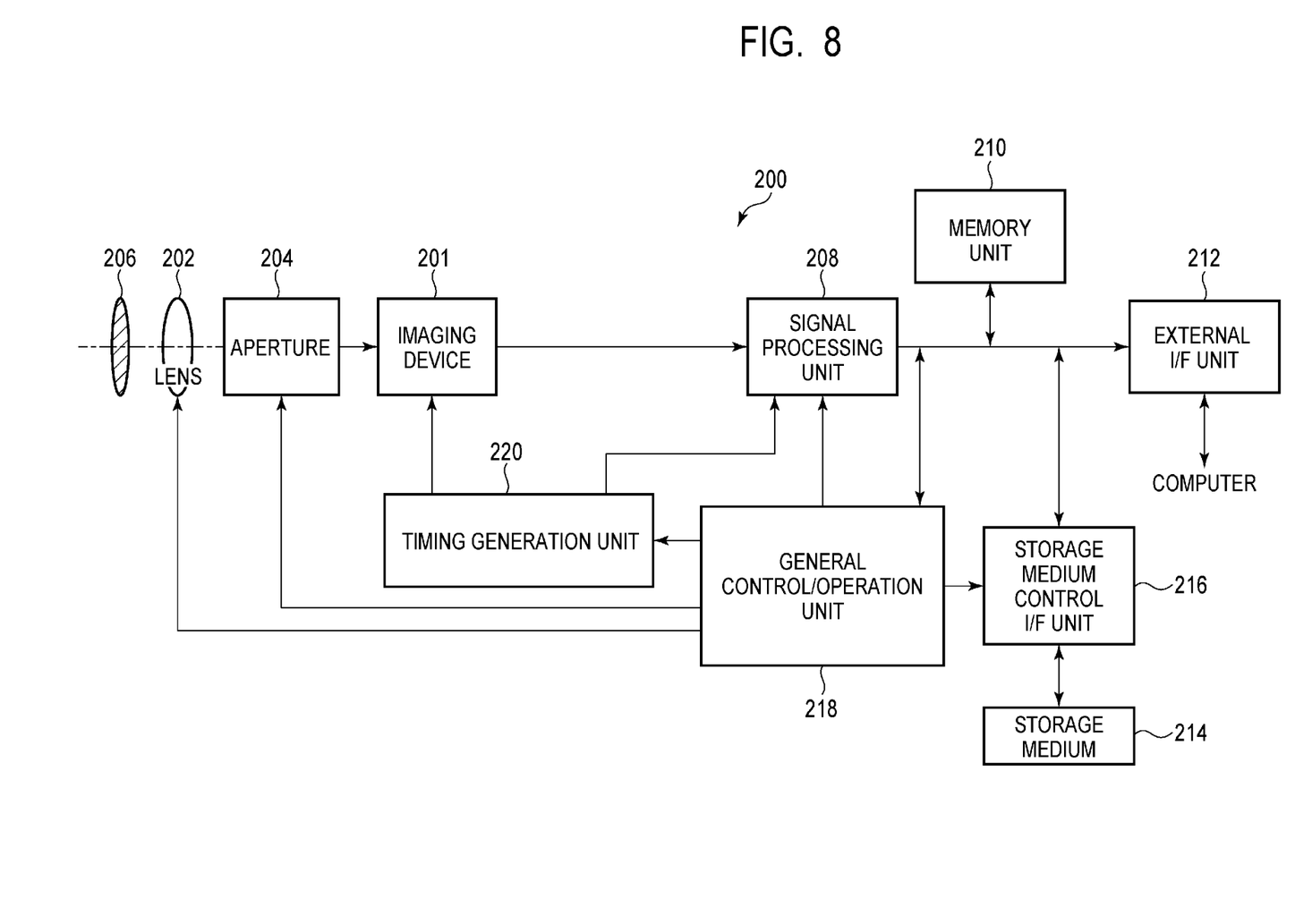
FIG. 8 is a block diagram illustrating a general configuration of an imaging system according to a fourth embodiment of the present invention.

An imaging system according to a fourth embodiment of the present invention will be described with reference to FIG. 8. FIG. 8 is a block diagram illustrating a general configuration of the imaging system according to the present embodiment.

The imaging device 100 described in the first to third embodiments described above can be applied to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 8 illustrates a block diagram of a digital still camera as an example out of these examples.

The imaging system 200 illustrated as an example in FIG. 8 includes an imaging device 201, a lens 202 that captures an optical image of an object onto the imaging device 201, an aperture 204 for changing a light amount passing through the lens 202, and a barrier 206 for protecting the lens 202. The lens 202 and the aperture 204 form an optical system that converges a light onto the imaging device 201. The imaging device 210 is the imaging device 100 described in any of the first to third embodiments and converts an optical image captured by the lens 202 into image data.

The imaging system 200 further includes a signal processing unit 208 that processes an output signal output from the imaging device 201. The signal processing unit 208 preforms an AD-conversion that converts an analog signal output by the imaging device 201 into a digital signal. In addition, the signal processing unit 208 performs various correction and compression other than above, if necessary, and outputting image data. An AD-conversion unit, which is a part of the signal processing unit 208, may be formed on a semiconductor substrate on which the imaging device 201 is provided or a semiconductor substrate on which the imaging device 201 is not provided. Further, the imaging device 201 and the signal processing unit 208 may be formed on the same semiconductor substrate.

The imaging system 200 further includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

The imaging system 200 further includes a general control/operation unit 218 that controls various operations and the entire digital still camera and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs an imaging signal to the signal processing unit 208. The signal processing unit 208 performs predetermined signal processing on an imaging signal output from the imaging device 201 and outputs image data. The signal processing unit 208 uses an imaging signal to generate an image.

As discussed above, according to the present embodiment, the imaging system to which the imaging device 100 according to the first to third embodiment is applied can be realized.

Fifth Embodiment

Figure 9A:
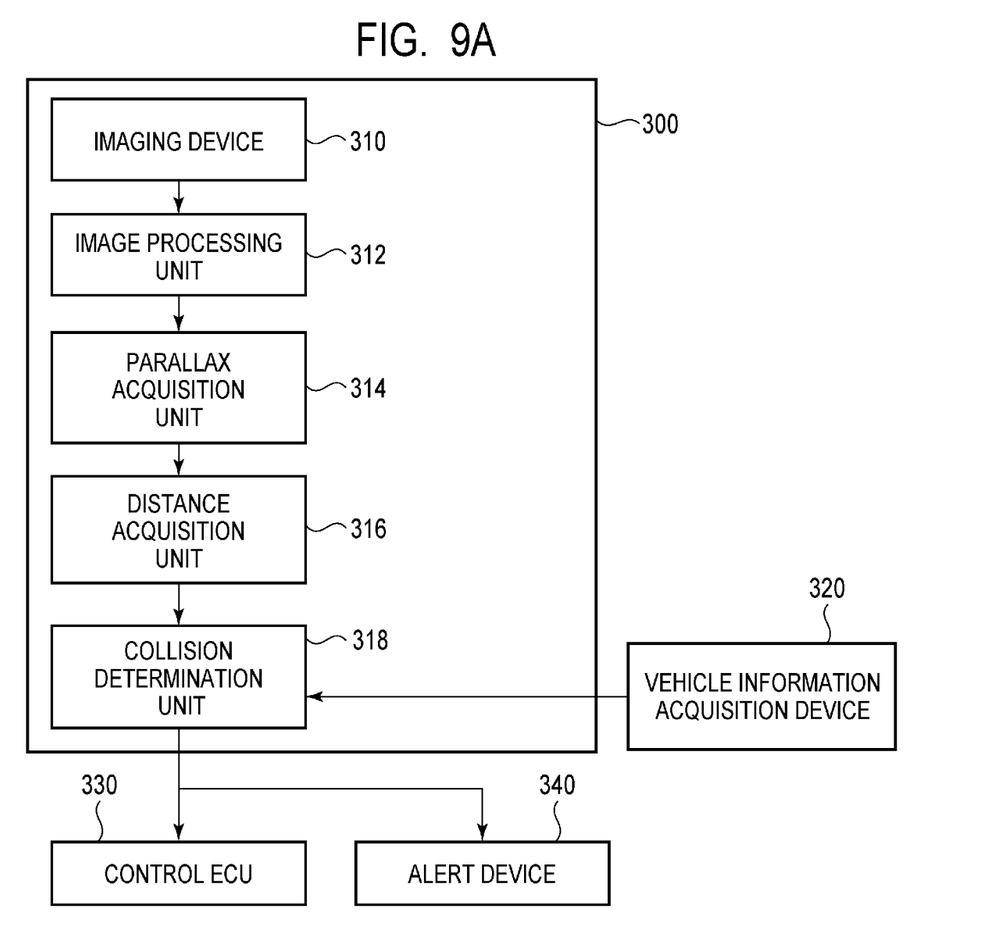
FIG. 9A is a diagram illustrating a configuration example of an imaging system according to a fifth embodiment of the present invention.
Figure 9B:
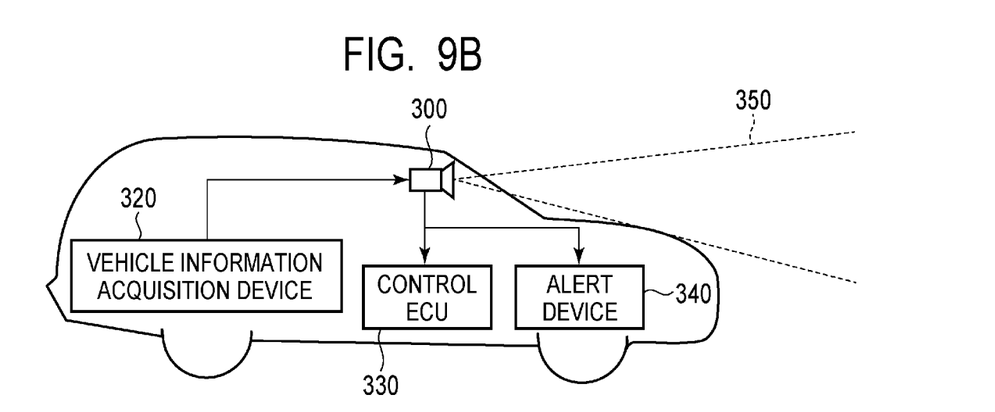
FIG. 9B is a diagram illustrating a configuration example of a movable object according to the fifth embodiment of the present invention.

An imaging system and a movable object according to a fifth embodiment of the present invention will be described with reference to FIG. 9A and FIG. 9B. FIG. 9A is a diagram illustrating a configuration of an imaging system according to the present embodiment. FIG. 9B is a diagram illustrating a configuration of a movable object according to the present embodiment.

FIG. 9A illustrates an example of an imaging system related to an on-vehicle camera. The imaging system 300 includes an imaging device 310. The imaging device 310 is the imaging device 100 described in any of the above first to third embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 9B illustrates the imaging system when a front area of a vehicle (a capturing area 350) is captured. The vehicle information acquisition device 320 transmits an instruction to the imaging system 300 or the imaging device 310. Such a configuration can further improve the ranging accuracy.

Although the example of control for avoiding a collision to another vehicle has been described, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention.

Further, in the first to third embodiments described above, while the example in which a common source amplifier circuit is applied to the amplifier circuit A1 has been illustrated, a circuit forming the amplifier circuit A1 is not limited to the common source amplifier circuit. For example, other amplifier circuits such as a differential amplifier circuit can be applied.

Further, the imaging systems illustrated in the above fourth and fifth embodiments are examples of an imaging system to which the photoelectric conversion device of the present invention may be applied, and an imaging system to which the photoelectric conversion device of the present invention can be applied is not limited to the configuration illustrated in FIG. 8 and FIG. 9A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-093163, filed May 14, 2018, which is hereby incorporated by reference herein in its entirety.

What is claimed is:

1. An imaging device comprising:
a plurality of pixels which are arranged to form a plurality of columns and each of which includes a photoelectric conversion unit that generates charges by photoelectric conversion;
a plurality of column circuits which are provided to the plurality of columns, respectively, and each of which receives a signal from a part of the plurality of pixels;
a first common control line connected to each of the plurality of column circuits; and
a control unit that controls the plurality of column circuits,
wherein each of the plurality of column circuits includes an amplifier circuit whose gain is switchable and a first transistor that controls a current flowing in the amplifier circuit, and
wherein the control unit controls the column circuit so that the first transistor supplies a current of a first current value when the amplifier circuit is at a first gain and the first transistor supplies a current of a second current value which is smaller than the first current value when the amplifier circuit is at a second gain which is larger than the first gain.

2. The imaging device according to claim 1, wherein the control unit supplies a bias voltage to the first transistor via the first common control line, and controls a current value of a current supplied by the first transistor by changing the bias voltage.

3. The imaging device according to claim 2, wherein each of the plurality of column circuits further includes a first sample and hold circuit that holds the bias voltage supplied to the first transistor.

4. The imaging device according to claim 1 further comprising a second common control line connected to each of the plurality of column circuits,
wherein each of the plurality of column circuits further includes a second transistor connected to the first transistor in a cascade configuration and controlled by a bias voltage supplied from the second common control line.

5. The imaging device according to claim 4, wherein each of the plurality of column circuits further includes a second sample and hold circuit that holds the bias voltage supplied to the second transistor.

6. The imaging device according to claim 4 further comprising a third common control line connected to each of the plurality of column circuits,
wherein each of the plurality of column circuits further includes a third transistor connected to the second transistor in a cascade configuration and controlled by a bias voltage supplied from the third common control line.

7. The imaging device according to claim 1,
wherein each of the plurality of column circuits includes an input capacitor in which a plurality of capacitance values are selectable and a feedback capacitor in which a plurality of capacitance values are selectable, and
wherein the first gain is switched to or from the second gain by changing a ratio of a capacitance value of the input capacitor and a capacitance value of the feedback capacitor.

8. The imaging device according to claim 2,
wherein a first bias voltage $V\alpha 1$ is supplied to a gate of the first transistor when the amplifier circuit is at the first gain,
wherein a second bias voltage $V\alpha 2$ is supplied to the gate of the first transistor when the amplifier circuit is at the second gain, and
wherein the control unit controls the bias voltage supplied to the first transistor so that the first bias voltage $V\alpha 1$, the second bias voltage $V\alpha 2$, and a source voltage VD of the first transistor satisfy a relationship of $(VD-V\alpha 2) < (VD-V\alpha 1)$.

9. The imaging device according to claim 1, wherein the amplifier circuit is a common source circuit.

10. The imaging device according to claim 1, wherein the amplifier circuit is a one-input, one-output circuit.

11. An imaging system comprising:
the imaging device according to claim 1; and
a signal processing unit that processes a signal output from the imaging device.

12. A movable object comprising:
the imaging device according to claim 1;
a distance information acquisition unit that acquires distance information on a distance to an object, from a parallax image based on signals output from the pixels of the imaging device; and
a control unit that controls the movable object based on the distance information.

13. A method of driving an imaging device including a plurality of pixels which are arranged to form a plurality of columns and each of which includes a photoelectric conversion unit that generates charges by photoelectric conversion, a plurality of column circuits which are provided to the plurality of columns, respectively, and each of which receives a signal from a part of the plurality of pixels, and a first common control line connected to each of the plurality of column circuits, wherein each of the plurality of column circuits includes an amplifier circuit whose gain is switchable and a first transistor that controls a current flowing in the amplifier circuit, the method comprising:
switching the bias voltage to be supplied to the first transistor of each of the plurality of column circuits via the first common control line in accordance with a gain of the amplifier circuit,
wherein the bias voltage is controlled so that the first transistor supplies a current of a first current value when the amplifier circuit is at a first gain and the first transistor supplies a current of a second current value which is smaller than the first current value when the amplifier circuit is at a second gain which is larger than the first gain.

* * * * *